Patented Aug. 31, 1943

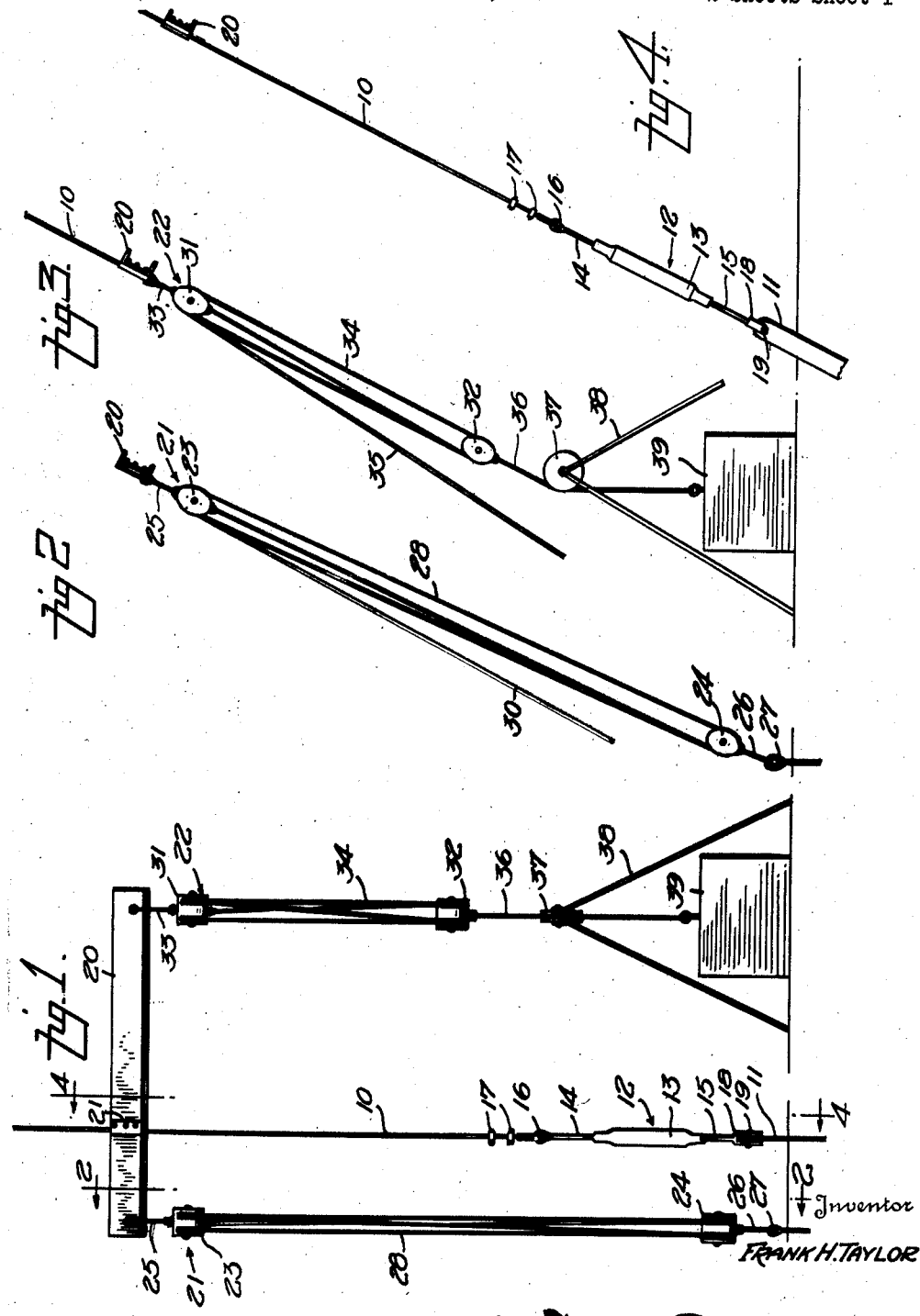
Aug. 31, 1943.  F. H. TAYLOR  2,328,364
CABLE TENSIONING MECHANISM
Filed July 30, 1942  2 Sheets-Sheet 1
Inventor
FRANK H. TAYLOR

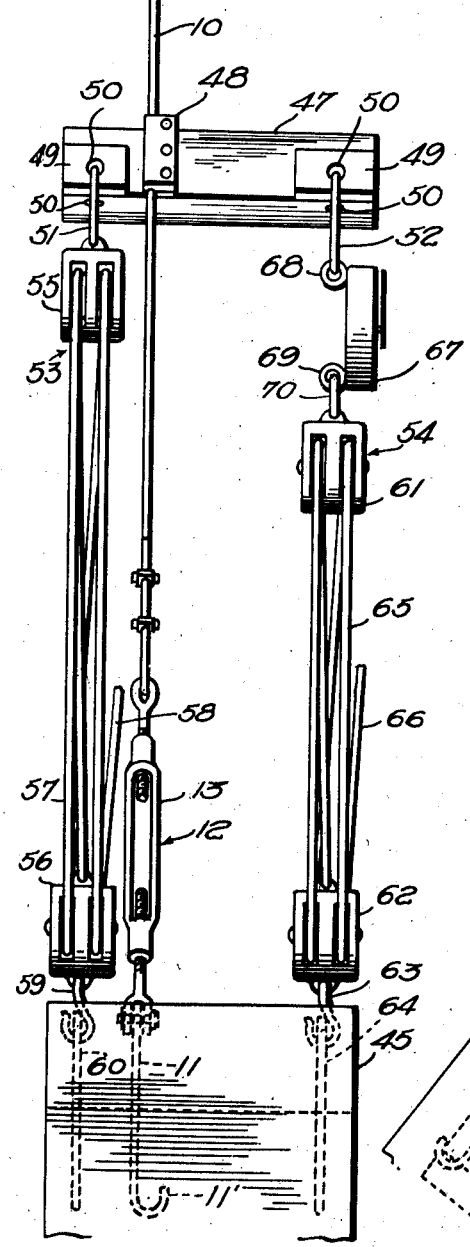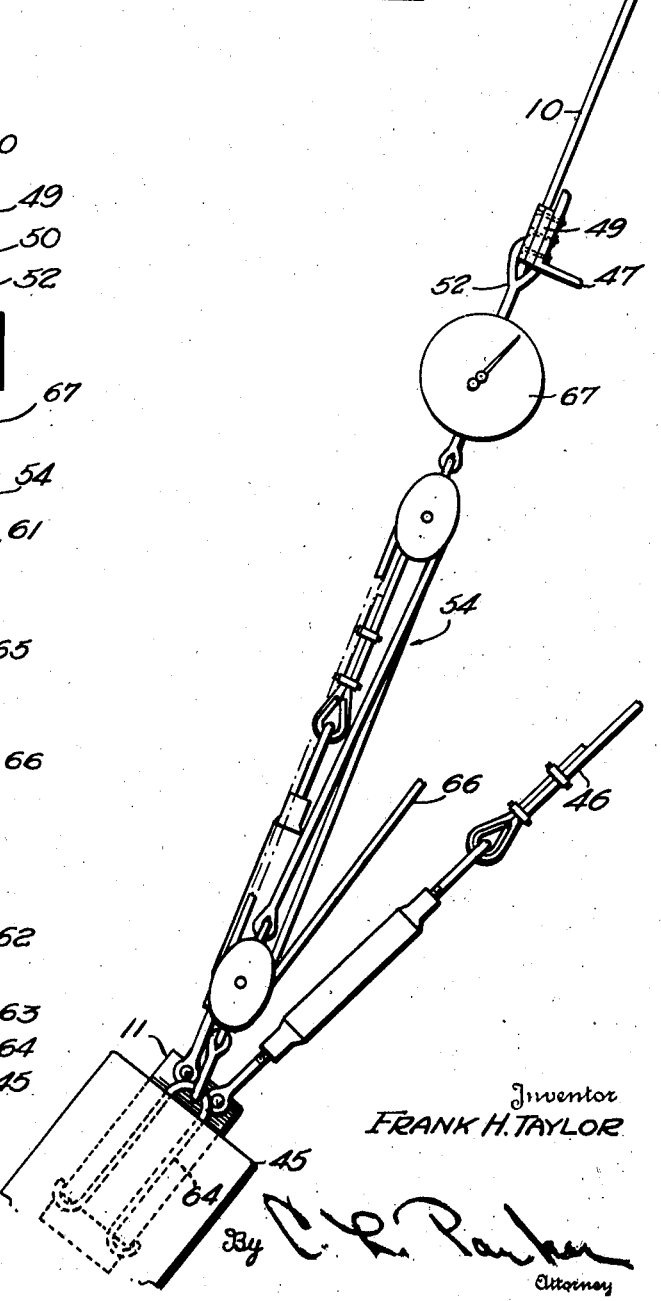

2,328,364

UNITED STATES PATENT OFFICE 2,328,364

CABLE TENSIONING MECHANISM

Frank H. Taylor, New York, N. Y., assignor to Lehigh Structural Steel Company, New York, N. Y., a corporation of Delaware Application July 30, 1942, Serial No. 452,978

9 Claims. (Cl. 265—1)

This invention relates to a cable tensioning mechanism, and more particularly to an apparatus operable in combination with the guy cables of radio towers and similar structures for placing the cables under proper predetermined tension.

While the invention is applicable for use in tensioning guy cables associated with any types of structures, it is particularly effective for use in tensioning the guy cables of the types of radio towers now in use, such a tower being of the single vertical unitary type resting on a single support and held in vertical position by guy cables anchored at their lower ends to the ground and connected at their upper ends to the tower in a common horizontal plane. Two ore more sets of such cables are frequently employed with each set connected to the tower in a common horizontal plane. The guy cables are tensioned to the desired calculated extent in accordance with the height of the tower, the distribution of the mass thereof, wind resistance, etc. To an engineer familiar with this type of installation, it is obvious that greater tension is highly disadvantageous since it results merely in overloading the cables to no useful purpose and may result in their breakage under increased strain. Tensioning of the cables below the desired predetermined point obviously is equally disadvantageous since it too greatly increases the latitude of swinging movement of the tower on its base.

The proper tensioning of the guy cables provides for a proper and desirable limited movement of the upper end of the tower and advantageously cushions such movement without unduly straining the cables and causing them to part. Heretofore, it has been necessary to determine when the proper tension has been placed in a cable by employing relatively expensive dynamometers and the desired results have been accomplished only under rather difficult conditions.

An important object of the present invention is to provide novel means operable in combination with a guy cable or the like whereby the cable may be placed under proper tension very quickly and easily, whereupon the apparatus may be quickly removed without disturbing the cable.

A further object is to provide a novel arrangement of parts wherein simple conventional devices may be employed in the combination to permit quick assembly of the parts and easy manual tensioning of the cable to the proper point.

A further object is to provide such an organization of the parts wherein the apparatus is capable of being mounted with respect to the cable without disturbing the normal operable position of the cable either in attaching the device or removing it, or in performing the operation of tensioning the cable.

A further object is to provide an apparatus of the character referred to wherein substantially the entire length of the cable is placed under the proper tension while being held by the apparatus almost exactly in its true normal operative position, after which the guy cable can be securely anchored with the exact desired tension maintained therein.

A further object is to provide a tensioning mechanism which is connectible to the cable at a point adjacent its lower end and which serves temporarily as the means for holding the cable in its proper position while introducing the desired degree of tensioning thereinto, after which the lower extremity of the cable may be quickly connected and tightened with respect to its anchoring means while holding the cable under proper tension, the weight of the parts employed with relation to the angularity of the cables being such that the resultant downward vertical forces acting on the cable are so negligible that the cable moves an inappreciable distance at its point of connection with the apparatus when the latter is removed.

A further object is to provide means temporarily connectible with the cable for properly tensioning the latter with the tensioning means engageable with permanent simple anchoring devices which are left in position after the apparatus is removed whereby it is ready for future use when it is desired to readjust the tensioning of the cable.

Other objects and advantages of the invention will become apparent during the course of the following description.

In the drawings I have shown two embodiments of the invention. In this showing

Figure 1 is a front elevation of the apparatus in position on a guy cable,

Figure 2 is a section on line 2--2 of Figure 1,

Figure 3 is an end elevation looking in the same direction as Figure 2,

Figure 4 is a section on line 4—4 of Figure 1,

Figure 5 is a front elevation of a modified and preferred type of apparatus, and Figure 6 is a side elevation of the same.

The form of the invention shown in Figures 1 to 4 inclusive generally illustrates the principles involved in the invention and has been shown in what might be termed semi-diagrammatic form. The radio tower or other structure in connection with which the tensioned cables are employed has not been illustrated since it forms no part of the invention and the latter is applicable to any cable or similar device which it is desired to place under predetermined tension in a predetermined position. Referring to Figures 1 and 4, the numeral 10 designates a guy cable of a radio tower or the like which it is desired to place under predetermined tension, the upper end of the cable being connected to the tower or other structure in a conventional manner and the lower end being fixed with respect to any suitable type of ground anchor 11. For connecting the cable 10 with respect to the ground anchor a turnbuckle 12 is employed, this device comprising the usual rotatable body 13 and threaded rods 14 and 15 mounted in axial alignment and oppositely threaded in the ends of the body 13. The upper end of the rod 14 is provided with an eye 16 through which the lower end of the cable passes, the extremity of the cable being suitably clamped to the body of the cable as at 17. The lower end of the rod 15 may be provided with a yoke 18 bolted as at 19 to the ground anchor 11.

A balancing member or cross bar 20 forms the only part of the present apparatus which is connected to or engageable with the cable 10. The balancing member may be of channel section as shown in Figures 2, 3 and 4. During the tensioning operation to be referred to, the member 20 is fixed with respect to the cable by any suitable type of clamp 21. Force is applied to opposite ends of the member 20 and for this purpose suitable sets of blocks and tackles, respectively indicated as a whole by the numerals 21 and 22, are employed.

The block and tackle set 21 comprises upper and lower sheave blocks 23 and 24 the former of which is connected as at 25 to the balancing member 20 and the latter of which is connected as at 26 to an anchor 27. A cable 28 is suitably conventionally passed around the wheels of the blocks 23 and 24 to provide the desired leverage whereby the necessary pull may be readily transmitted manually to the free end of the cable 28, such end being shown in Figure 2 and indicated by the numeral 30.

The block and tackle set 22 comprises upper and lower sheave blocks 31 and 32 the former of which is connected as at 33 to the adjacent end of the balancing member 20. The point of connection of the member 33 with the balancing member 20 is preferably spaced a substantially greater distance from the cable 10 than the point of connection of the members 25 and 20. This arrangement provides substantially greater leverage at one end of the member 20 to permit the use of a much lighter weight as will become apparent.

A cable 34 is conventionally passed around the blocks 31 and 32 and has its free end 35 (Figure 3) arranged to be grasped by the hand of the operator to assert a manual pull thereon. The block 32 is connected to one end of a flexible element 36 which passes around a sheave 37 held in position by any suitable support 38, the lower end of the vertical portion of the flexible element 36 being connected to a weight 39. This weight may be of any desired type and it is convenient to employ a concrete block of desired weight. During the tensioning of the apparatus, as will be described, the weight 39 rests upon the surrounding surface of the ground and the proper tensioning of the cable is reached when the weight is lifted just clear of the ground. This is done with the lower end of the cable 10 free, and when the desired tension has been reached the turnbuckle 12 is applied and tightened. This operation will be more fully described later.

The form of the invention shown in Figures 5 and 6 is similar in principle to that described but is preferred because of its simplicity and compactness and for other reasons which will become apparent. Referring to Figures 5 and 6 it will be noted that the cable and the elements associated therewith for anchoring it with respect to the ground are the same as in the form of the invention previously described, and such parts have been indicated by the same reference numerals. However, the ground clamp 11 has been more particularly illustrated as being in the form of a plate embedded in a concrete anchor block indicated by the numeral 45, the lower end of the plate being turned as at 11' to secure a more perfect permanent anchoring of the plate with respect to the block. The plate 11 also has been shown in Figure 6 as having a second guy cable and associated elements connected thereto, this cable being indicated by the numeral 46 and forming one of a plurality of cables which may be anchored to the same block 45 and connected to the radio tower or the like at a point spaced beneath the points of connection of the plurality of cables of which the cable 10 is one. It will become apparent that the present apparatus is highly efficient for tensioning each cable of all of the sets of the guy cables employed.

A balancing member 47, similar to but shorter than the member 20 previously described, is provided with a clamp 48 for fixing it with respect to the cable 10. The member 47 may be of any desired section and is shown in Figure 6 as being of angle section. The member 47 may be provided with plates 49 and these plates and the member 47 may be apertured as at 50 to receive connecting elements 51 and 52 associated with block and tackle assemblies respectively indicated as a whole by the numerals 53 and 54. The assembly 53 comprises upper and lower sheave blocks 55 and 56 around the wheels of which is conventionally passed a cable 57 to provide the desired leverage. One end of the cable 57 may be connected to the lower block 56 while the other end, indicated by the numeral 58, is adapted to be pulled by an operator to move the corresponding end of the balancing member 47 downwardly. The connecting element 51 is connected to the block 55, while the block 56 is provided with a hook 59 engageable with the loop of a hairpin anchor 60 embedded in the block 45.

The assembly 54 comprises upper and lower sheave blocks 61 and 62 the lower of which is provided with a hook 63 engageable with another hairpin anchor 64 also embedded in the block 45. A cable 65 passes around the wheels of the blocks 61 and 62 and has a free end 66 to be pulled by the operator to move the corresponding end of the balancing member 47 downwardly.

In one of the sheave block assemblies a force measuring device is inserted and in Figure 5 such device has been indicated as a dynamometer 67 having a pair of rings 68 and 69, one of which is carried by the casing of the dynamometer and the other of which is connected to the force indicating mechanism. This device has been shown as being arranged in the sheave assembly 54 with the ring 69 connected as at 70 to the block 61 and with the ring 68 secured to the connecting element 52. The dynamometer 67 may be an ordinary spring scale of sufficiently heavy capacity to take care of the forces which it is called upon to withstand and to measure.

The operation of the apparatus is as follows:

It will be apparent in the form of the invention shown in Figures 1 to 4 inclusive that the point of connection of the turnbuckle 12 with the anchor 11 and the point of connection of the sheave block 24 with the anchor 27 lie in a common plane with the connecting element 25, cable 10 and balancing member 20 and this plane will be perpendicular to a plane passing through the cable 10 and the axis of the radio tower or other element being guyed. The forces being applied through the sheave assembly 22 also lie in the common plane referred to. It also will be apparent that the forces applied through the two sets of sheave assemblies are parallel to the cable 10. The same general arrangement of parts also is provided in the form of the invention shown in Figures 5 and 6 except that both sheave assemblies are anchored to the block 45 instead of employing the weight 39 as the means for determining the maximum tensioning force. All of the anchoring points for the sheave assemblies and for the cable 10 in Figure 5 lie in a common plane corresponding to that referred to above.

It will be apparent therefore that the attachment of either form of the invention to the cable results in the use of the present device for supporting the cable exactly in the position which it will occupy later when the apparatus is removed. This is important since any shifting of the point in the cable 10 engaged by the clamps 21 or 48 when the device is removed would result in a reduction in the tensioning force of the cable.

In using the form of the invention shown in Figure 1, the apparatus will be set up with the support 38 arranged in such position that the portion of the cable 36 between the block 32 and pulley 37 will lie in a common plane with the cable 10 and the line of force being applied through the sheave assembly 21. This common plane obviously will include the connecting point 19 between the turnbuckle 12 and anchor 11. As soon as the parts have been set up as described, the operation of tensioning the cable may begin. This operation is initiated, of course, with the weight 39 resting on the ground. The weight 39 may be of any form and is preferably a concrete block of predetermined weight in accordance with the desired tensioning of the cable 10 and in accordance with the relative lever lengths of the portions of the member 20 on opposite sides of the line of the cable 10.

The operators will pull downwardly on the free cable ends 30 and 35 to pull the balancing member 20 downwardly to increasingly tension the portion of the cable between the member 20 and the mast or tower being erected. Care will be taken to maintain the member 20 perpendicular to the cable. When the exact point is reached at which the cable 10 is tensioned to its predetermined extent, the upward force being exerted on the weight end of the member 20 will equal the weight 39 and the latter will start to move vertically from the ground. At this point further pulling on the cables 30 and 35 will be stopped, the proper tensioning of the cable having been reached between the member 20 and the tower. The turnbuckle 12 will now be applied, or will be tightened if it has been previously applied, and the tightening of the turnbuckle will continue until it reaches a point at which the tension in the cable line between the clamp 21 and the anchor 11 very slightly exceeds the tension of the cable 10 between the balancing member 20 and the tower. This will be indicated by a slight downward movement of the weight 39, the lever arm of the member 20 to which the member 33 is connected providing for an appreciable lowering of the weight 39 when tension of the lower end of the cable very slightly exceeds the tension of the upper end thereof. The entire link of the cable 10 and associated elements will now be approximately uniformly tensioned at the proper point. The lines 30 and 35 now may be released and the clamp 21 removed, whereupon the connecting element 26 may be released from the hook of the anchor 27.

It will be obvious that the removal of the apparatus in the manner referred to will leave the cable 10 in exactly the same position as when the tensioning operation had been completed by the pulling on the lines 30 and 35. All forces will have been applied in the common plane referred to and along lines parallel to the cable 10, and accordingly this cable will remain, after removal of the apparatus, in the same position as before and will be properly tensioned. The same operation, of course, is performed for each of the guy cables.

The operation of the form of the invention shown in Figures 5 and 6 will be substantially the same as in the form previously described. Forces will be applied along lines parallel to the cable 10 and in the plane of this cable, as in the previously described form of the invention. Therefore, the cable will be both properly tensioned and pulled to the exact position which it will occupy after the apparatus is removed. The only difference in procedure in the form of the invention shown in Figures 5 and 6 lies in the fact that instead of exerting the forces until a weight lifts from its supporting surface, the forces are applied until the dynamometer 67 indicates proper reading. At this point the pulling on the lines 58 and 66 will stop and the tightening of the turnbuckle 12 will be carried out up to the point where the indicating finger of the dynamometer starts to drop. The turning of the body of the turnbuckle is then stopped and the apparatus is removed by loosening the clamp 48 and disconnecting the hooks 59 and 63 from the anchors 60 and 64.

It will be apparent that the device shown in Figures 5 and 6 is more compact than the form of the device previously described. It also will be apparent that the two hairpin anchor bolts 60 and 64 are left permanently in the block 45 for further use in retensioning the cable, if necessary, or for use in replacing a broken cable. The distance between the anchors 11 and 60 equals the distance between the cable 10 and the point of connection of the connecting element 51 with the openings 50. Similarly, the distance between the anchors 11 and 64 coincides with the distance between the cable 10 and the openings 50 for the connecting element 52. Obviously, therefore, the balancing member 47 and its associated elements are designed for cooperation with the anchors 60 and 64, these elements in the blocks associated with each of the anchors 10 for the tower bearing the same arrangement with respect to the various anchors 11 as described above so that the tensioning apparatus is movable to and operative in connection with each guy cable 10 to provide quick and accurate means for positioning and tensioning the cables.

As previously stated the importance of properly tensioning the guy cables of radio towers and the like is obvious to engineer's skilled in this work. In the erection of structures of this character, therefore, great care is taken to provide the calculated predetermined tension in each cable so as to properly maintain the guy structure in vertical position within reasonable swaying limits without overloading the guy cables. The present apparatus operates in combination with the guy cable in a novel manner to exactly tension the cables. The apparatus is very quickly and easily applied, the anchors 60 and 64 having been molded into the block 45, and with the parts designed with respect to each other there can be no misapplication or misassembly of the parts. Each tensioning operation can be completed in a very short space of time and the removal of the apparatus requires only the loosening of the clamp 48 and the disengagement of the hooks 59 and 63 from their anchors.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A mechanism for tensioning a guy cable of a vertical structure wherein the upper end of the cable is connected to the structure and an anchor is provided for connection with the lower end of the cable whereby, when the cable is tensioned, it will be arranged in a predetermined approximate line, comprising a balancing member adapted to be horizontally arranged perpendicular to the cable, a clamp for connecting the balancing member between its ends to the cable at a point spaced from the lower end thereof, and a pair of force-applying devices connected at their upper ends to said balancing member at points spaced on opposite sides of said clamp and arranged to apply a downward force to said balancing member in lines approximately parallel to said predetermined line of said cable in the portion thereof between said clamp and said anchor whereby, when the portion of the cable above the balancing member is pulled to a predetermined tension it will be arranged in said predetermined line, one of said force-applying devices comprising means for determining when the portion of the cable above said clamp has reached its predetermined tension, the portion of the cable between said clamp and said anchor having take-up means therein for tightening such portion of the cable after the portion of said cable above said clamp has been tensioned to the predetermined extent.

2. A mechanism for tensioning a guy cable of a vertical structure wherein the upper end of the cable is connected to the structure and an anchor is provided for connection with the lower end of the cable whereby, when the cable is tensioned, it will be arranged in a predetermined approximate line, comprising a balancing member adapted to be horizontally arranged perpendicular to the cable, a clamp for connecting the balancing member between its ends to the cable at a point spaced from the lower end thereof, and a pair of block and tackle assemblies connected to said balancing member at points spaced from said clamp on opposite sides thereof and arranged to exert downward forces on said balancing member in lines spaced from and parallel to said predetermined line of the portion of said cable between said clamp and said anchor, each of said assemblies having a flexible member provided with a free end to be pulled to generate a force applied to said balancing member, one of said assemblies having means for indicating when the portion of the cable above said clamp has been tensioned to a predetermined extent, the portion of the cable between said balancing member and said anchor having take-up means for tensioning such portion of the cable after the portion of the cable above said clamp has been tensioned to a predetermined extent.

3. A mechanism for tensioning a guy cable of a vertical structure wherein the upper end of the cable is connected to the structure and an anchor is provided for connection with the lower end of the cable whereby, when the cable is tensioned, it will be arranged in a predetermined approximate line, comprising a balancing member adapted to be horizontally arranged perpendicular to the cable, a clamp for connecting the balancing member between its ends to the cable at a point spaced from the lower end thereof, a base structure by which said anchor is carried, a pair of anchors carried by said base structure at points spaced from said first named anchor on opposite sides thereof, and a pair of force-applying devices connected at their upper ends to said balancing member at predetermined points and detachably connected at their lower ends to the respective anchors of said pair, said predetermined points and said pair of anchors being arranged in a common plane with the predetermined line of the portion of the cable between said clamp and said first named anchor, said force-applying devices being arranged to transmit downward forces to said balancing member in lines parallel to the predetermined line of such portion of the cable, one of said force-applying devices comprising means for indicating when the portion of the cable above said clamp has been tensioned to a predetermined degree, the portion of the cable between said clamp and said first named anchor having take-up means operable after the last named portion of said cable has been tensioned to said predetermined extent.

4. Apparatus constructed in accordance with claim 3 wherein each force-applying device comprises a block and tackle assembly including a flexible element having a free end to be pulled by an operator to generate the force transmitted to said balancing member.

5. In combination with a cable to be placed under tension, wherein the cable is connected at one end to a given structure and has means at its other end to be connected to an anchor, a tensioning apparatus comprising a balancing member having means for detachably connecting it to the cable in a position approximately perpendicular thereto at a point spaced from the last named end thereof, a pair of force-applying devices connected to said balancing member on opposite sides of and spaced from its point of connection with the cable and arranged to apply forces to said balancing member in lines parallel to and in a common plane with a line from said detachable connecting means to said anchor, one of said force-applying devices comprising means for indicating when the tension of the cable between said structure and said balancing member has reached a predetermined point, and a take-up device in said cable between said balancing member and said anchor.

6. The combination set forth in claim 5 wherein said indicating means comprises a dynamometer, said take-up device comprising a turnbuckle for tensioning the portion of the cable between said balancing member and said anchor after said first named portion of the cable has been tensioned to said predetermined extent.

7. In combination with a cable to be placed under tension, wherein the cable is connected at one end to a given structure and has means at its other end to be connected to an anchor, a tensioning apparatus comprising a balancing member having means for detachably connecting it to the cable in a position approximately perpendicular thereto at a point spaced from the last named end thereof, a pair of block and tackle assemblies connected to said balancing member at points spaced from said clamp on opposite sides thereof and arranged to exert forces on said balancing member in the direction of said anchor in lines spaced from and parallel to a line between said detachable connection and said anchor, each of said assemblies having a flexible member provided with a free end to be pulled to generate the force applied to said balancing member, one of said assemblies having means for indicating when the portion of the cable between said structure and said balancing member has been tensioned to a predetermined extent, and take-up means in the portion of said cable between said balancing member and said anchor for tensioning such portion of the cable after the first named portion of the cable has been tensioned to said predetermined extent.

8. In combination with a cable to be placed under tension, wherein the cable is connected at its upper end to a structure to be supported, and an anchor, the lower end of said cable having means for connecting it to said anchor, a tensioning apparatus comprising a balancing member, means for detachably connecting said member to the cable in a position approximately perpendicular thereto and at a point spaced from the lower end thereof, a base structure by which said anchor is carried, a pair of anchors carried by said base structure at points spaced from said first named anchor, and a pair of force-applying devices connected at their upper ends to said balancing member on opposite sides of said clamp and detachably connected at their lower ends to the respective anchors of said pair, the points of connection of said force-applying devices to said balancing member and to said pair of anchors being in a common plane with the predetermined line of the portion of the cable between the detachable connecting means and said first named anchor, said force-applying device being arranged to transmit downward forces to said balancing member in lines parallel to said predetermined line of said portion of the cable, one of said force-applying devices comprising means for indicating when the portion of the cable above said clamp has been tensioned to a predetermined degree, and take-up means in the cable between said balancing member and said first named anchor.

9. The combination defined in claim 8 wherein each force-applying device comprises a block and tackle assembly including a flexible element having a free end to be pulled by the operator to generate the force transmitted to said balancing member.

FRANK H. TAYLOR.